United States Patent [19]
Schutz et al.

[11] Patent Number: 5,579,988
[45] Date of Patent: Dec. 3, 1996

[54] CLAD REACTIVE METAL PLATE PRODUCT AND PROCESS FOR PRODUCING THE SAME

[75] Inventors: Ronald W. Schutz, Canfield; Stanley R. Seagle, Warren, both of Ohio

[73] Assignee: RMI Titanium Company, Niles, Ohio

[21] Appl. No.: 489,033

[22] Filed: Jun. 9, 1995

[51] Int. Cl.⁶ .................................................. B23K 20/04
[52] U.S. Cl. ........................ 228/235.2; 228/186; 228/190
[58] Field of Search .................................. 228/107, 175, 228/186, 190, 193, 235.2, 235.3

[56] References Cited

U.S. PATENT DOCUMENTS

| | | | |
|---|---|---|---|
| 3,059,324 | 10/1962 | Goff | 228/235.2 |
| 3,800,406 | 4/1974 | Hagan et al. | 228/158 |
| 4,459,062 | 7/1984 | Siebert | 228/165 |
| 4,777,098 | 10/1988 | Takamura et al. | 428/664 |
| 4,839,242 | 6/1989 | Murayama et al. | 428/660 |
| 4,966,816 | 10/1990 | Wardlaw et al. | 428/660 |
| 5,115,963 | 5/1992 | Yasui | 228/157 |

*Primary Examiner*—Samuel M. Heinrich
*Attorney, Agent, or Firm*—Scully, Scott, Murphy & Presser

[57] ABSTRACT

A cost effective process is provided for the production of a clad reactive metal plate composite that contains a complete metallurgical bond between a reactive metal or metal alloy backer plate and the cladding layer which is employed in the present invention as the cladding plate. The full metallurgical bond is achieved in the present invention by maintaining a small gap between the cladding plate and the backer plate in the composite assembly. The small gap, which optionally may contain a evacuation nipple, may be obtained by placing shims composed of the backer plate material between the backer plate and the cladding plate in the composite assembly prior to sealing and hot working the assembly. Also, provided is a highly corrosion resistant clad reactive metal plate composite which comprises a reactive metal or metal alloy cladding layer that is completely bonded to a reactive metal or metal alloy backer plate through a metallurgical bond.

26 Claims, 3 Drawing Sheets

CLAD REACTIVE METAL PLATE PRODUCT AND PROCESS FOR PRODUCING THE SAME

FIELD OF THE INVENTION

The present invention is directed to a cost effective process for producing a clad reactive metal plate composite which comprises a clad layer composed of a chemically resistant reactive metal or metal alloy which is fully, metallurgically bonded to a chemically resistant reactive metal or metal alloy backer plate. More specifically, the present invention relates to a hot rolling bonding process for producing the aforementioned clad reactive metal plate composite. As stated above, the present invention provides a more cost effective process for utilizing reactive metals in forming a clad plate composite containing the same than heretofore known.

The present invention also provides a clad reactive metal plate composite which contains a clad layer of a chemically resistant reactive metal or metal alloy which is completely bonded to a backer plate, which is also composed of a chemically resistant reactive metal or metal alloy, through a metallurgical bond. Such a clad plate composite exhibits high corrosion resistance and can be used in a wide variety of applications such as in the production of tanks, vessels, pressure vessels, ducting, tubsheets, piping, flanges and anodes. Moreover, the clad plate composites produced in the present invention exhibit mechanical properties; i.e., tensile strength, % elongation and yield strength which are comparable to standard solid metal plates and prior art clad composites that are produced using alternative processes.

BACKGROUND OF THE INVENTION

In recent years, clad metal plates have come to be widely used due to the fact that they take advantage of favorable properties of the base, i.e. backer, metal as well as the cladding material. For example, the corrosion resistance of a titanium base plate can be enhanced by cladding the plate with a reactive metal or metal alloy that exhibits higher corrosion resistance than the base plate.

At present, titanium clad plate composites containing a titanium base plate and a cladding plate may be manufactured by either explosive cladding methods or by encasing the entire composite assembly in an external pack.

The explosive cladding methods employed in the prior art have the drawback that they require at least one soft metal to ensure formation of a sound bond between the backer plate and the cladding plate. Furthermore, these explosive cladding methods are relatively expensive processes, and in some instances a true metallurgical bond between the base plate and the cladding plate may not always be achieved. Accordingly, explosive cladding methods are not cost effective, and thus are not practical for use in bonding a reactive metal or metal alloy cladding to a backer plate that is composed of a reactive metal or metal alloy.

In the prior art, a cladding plate composed of a reactive metal or metal alloy may be bonded to a backer plate by surrounding the entire periphery of the composite assembly in an external pack composed of a metal such as steel. The external pack is first sealed and then the cladding plate is bonded under vacuum to the backer plate. This bonding is conducted under a vacuum to avoid the formation of unwanted surface oxides and/or nitrides at the interface which may cause deterioration of the bond thus formed. The pack assembly is then rolled to a final desired gauge using standard roll milling processes and the external pack is removed and discarded. Although the use of an external pack is feasible in providing a clad plate composite composed of reactive metals, it is not practical since it is too costly and it oftentimes requires the use of expensive parting agents.

Despite the current state in the art there is still a need for improved cost effective processes for producing a composite product that exhibits high corrosion resistant and which contains a stable bond between the backer plate and the cladding plate.

SUMMARY OF THE INVENTION

The present invention is directed to a cost effective process for producing a clad reactive metal plate composite which contains at least one clad layer of a chemically resistant reactive metal or metal alloy metallurgically bonded to at least one chemically resistant reactive metal or metal alloy backer plate. More specifically the process of the present invention comprises the steps of (a) providing a composite assembly, wherein said composite assembly comprises at least one chemically resistant reactive metal or metal alloy backer plate, at least one cladding plate composed of a chemically resistant reactive metal or metal alloy, and at least one small gap located between the backer plate and the cladding plate; (b) sealing the composite assembly of step (a) along its perimeter under conditions sufficient to provide a self-contained envelope; and (c) hot roll bonding the self-contained envelope of step (b) under conditions sufficient to form a metallurgical bond between the backer plate and the cladding plate.

As stated above, the backer plate and the cladding plate employed in the instant invention are composed of a chemically resistant reactive metals or metal alloys. The term chemically resistant reactive metal or metal alloy is used herein to denote a reactive metal or metal alloy that is highly resistant to corrosion. Suitable reactive metals include titanium, zirconium, tantalum and niobium. Alloys of these reactive metals are also contemplated herein.

In one highly preferred embodiment of the present invention, the backer plate is composed of pure titanium or titanium that is alloyed with one or more of aluminum, vanadium, molybdenum, zirconium, nickel or palladium; and the cladding plate is composed of titanium that is alloyed with zirconium.

In accordance with one embodiment of the present invention, the gap in the composite assembly is provided by placing shims between the backer plate and the cladding plate along the perimeter of the assembly. The shims are relatively small in dimensions and are typically composed of the same type of material as is used in the backer plate. In accordance with this embodiment of the present invention, the composite assembly is partially welded under an inert gas atmosphere leaving a small exhaust hole, wherein an evacuation nipple composed of the same reactive metal as the shim is welded into the exhaust hole. Residual air and the inert gas used in partially welding the composite assembly are then evacuated out of the composite assembly. The evacuated assembly is then completely welded shut under vacuum and the self-contained envelope thus fabricated is subjected to hot roll bonding.

It should be noted that other processing steps such as metal pre-treatment steps and metal post-treatment steps that are commonly employed in the prior art may also be used in the present invention. For example, the backer plate and the cladding plate may be pre-treated by grinding and/or pickling these plates prior to fabricating the aforementioned composite assembly. Likewise, the clad reactive metal plate composite of the instant invention may be subjected to one or more post-treatment processes such as sandblasting, pickling, ultrasonic inspection, hot rolling to gauge and annealing.

In accordance with another aspect of the present invention, a highly corrosion resistant clad plate composite composed of reactive metals is provided. More specifically, the clad plate composite of the present invention comprises at least one clad layer composed of a chemically resistant reactive metal or metal alloy which is metallurgically bonded to at least one reactive metal or metal alloy backer plate. The term metallurgical bond is used herein to denote a diffusion bond which is formed in the present invention between the reactive metal cladding and the reactive metals contained in the backer plate. The clad reactive metal composite plates produced in the present invention represent an advancement over prior art composites in that a stable bond can be formed which does not tend to deteriorate with thermal exposure over time. Moreover, the composite plates produced in the present invention contain a stronger backer plate than heretofore known and have higher modules characteristics than prior art composites. These properties improve the structure efficiency of the composite plates of the instant invention.

DETAILED DESCRIPTION OF THE INVENTION

Figure 1:
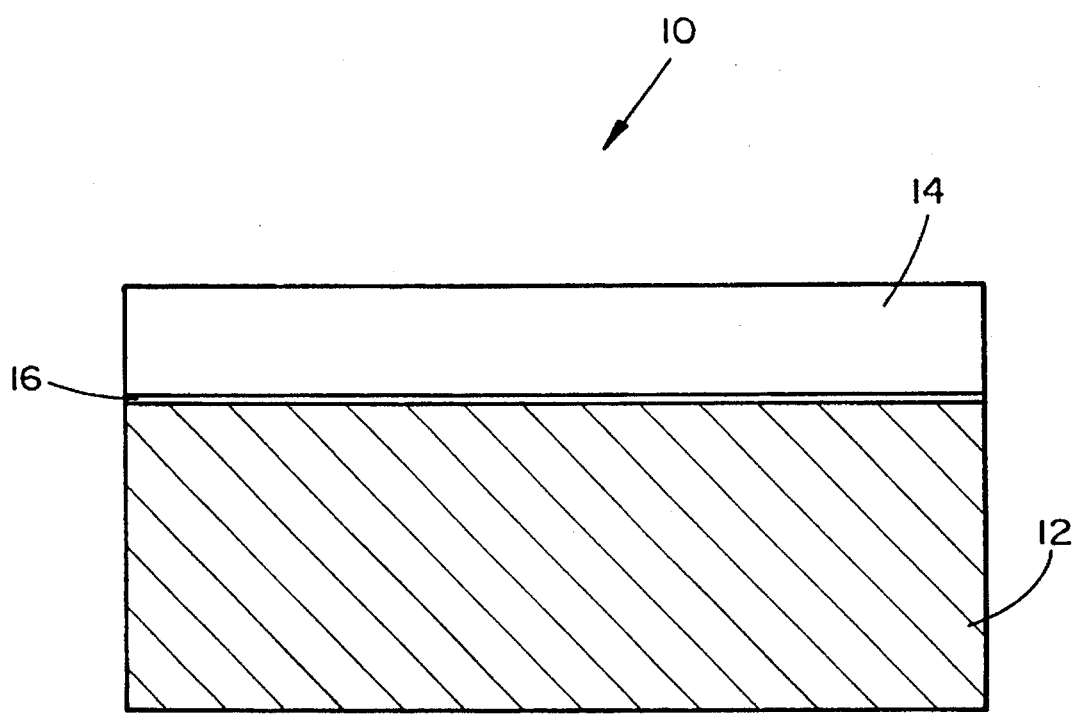
FIG. 1 is a cross-sectional view of one possible composite assembly prior to sealing that may be used in the present invention.

As stated hereinabove, the present invention provides a process for producing a clad reactive metal or metal alloy plate composite which contains at least one clad layer of a chemically resistant reactive metal or metal alloy that is metallurgically bonded to at least one backer plate that is composed of a reactive metal or metal alloy. More specifically, the process of the present invention comprises (a) providing a composite assembly, wherein said composite assembly comprises at least one chemically resistant reactive metal or metal alloy backer plate, at least one cladding plate of a chemically resistant reactive metal or metal alloy, wherein the cladding plate is position in proximity to said backer plate so that there is at least one relatively small gap located between the backer plate and the cladding plate; (b) sealing the composite assembly of step (a) under conditions effective to provide a self-contained envelope; and (c) hot roll bonding the self-contained sealed envelope of step (b) under conditions sufficient to form a metallurgical bond between the backer plate and the cladding plate.

In accordance with the present invention, the backer plate is composed of a chemically resistant reactive metal or metal alloy which includes reactive metals such as titanium, zirconium, tantalum, niobium and alloys thereof. In a preferred embodiment of the instant invention the backer plate is composed of pure titanium or titanium that is alloyed with one or more of aluminum, vanadium, molybdenum, zirconium, nickel or palladium. Suitable titanium alloys that may be employed in the present invention as the backer plate include, but are not limited to, Ti-0.3Mo-0.8Ni and Ti-3Al-2.5 V.

The reactive metal or metal alloy backer plate used in the present invention prior to hot roll bonding may have any shape or size limited only by the size of the processing equipment used in producing the final composite product and by the desired product being produced.

After employing hot roll bonding to the composite, the backer plate typically has a thickness up to about 75 mm. More preferably, the reactive metal or metal alloy backer plate after rolling has a thickness of from about 1.5 to about 60 mm.

The backer plate may be employed as is, or it may be post-treated using techniques well known to those skilled in the art to remove unwanted surface oxides and nitrides and/or to provide a smooth surface. For example, the reactive metal or metal alloy backer plate may be ground, shotblasted and/or pickled prior to use in the present invention. If pickling is employed in the present invention to remove surface oxides and nitrides from the backer plate, it is preferred that an acid mixture such as hydrofluoric-nitric acid be employed. Pickling may also be conducted using dilute hydrofluoric acid.

As stated hereinabove, the cladding plate employed in the present invention is also composed of a chemically resistant reactive metal or metal alloy which can be the same or different from the reactive metal in the backer plate. When the reactive metals are different, the cladding plate usually contains a reactive metal or metal alloy that is more expensive and more chemically resistant than the reactive metal in the backer plate.

Examples of such reactive metals that may be employed as the cladding plate include titanium, zirconium, niobium, tantalum and their alloys. Mixtures of these metals are also contemplated in the present invention. In a highly preferred embodiment of the present invention the cladding plate is composed of titanium that is alloyed with zirconium.

The thickness of the cladding plate prior to hot rolling may vary depending upon the type of composite product being produced. For example, if anodes or ducting is being produced the cladding layer will be thin. On the other hand, if high pressure reactors are being produced the cladding layer may have a much higher thickness. It should be noted that in the instant invention the thickness of the cladding plate is smaller than the thickness of the backer plate.

Generally, in the present invention the cladding plate in the composite assembly is rolled to a thickness of from about 0.5 to about 10 mm. More preferably, the cladding plate employed in the present invention is rolled to a thickness of from about 1.0 to about 3.0 mm.

As is the case with the backer plate, the cladding plate may be subjected to various post-treatment methods to clean the surface and/or to provide a smooth surface.

In accordance with the present invention, the composite assembly employed contains a relatively small gap between the backer plate and the cladding plate. By relatively small, it is meant that a space of from about 10 to about 100 mils is provided between the backer plate and the cladding plate. A small evacuation nipple or tube may or may not be inserted into the gap to aid in evacuating residual air and other gases from the gap. When present, the evacuation nipple is composed of the same reactive metal or metal alloy as is in the backer plate.

This gap can be provided in the present invention by either simply laying the cladding plate onto the backer plate or, more preferably, it is provided by inserting small shims between the backer plate and the cladding plate. More specifically, when shims are employed in the present invention, they are positioned around the backer plate perimeter of the composite assembly and are located in-between the backer plate and the cladding plate.

Figure 2:
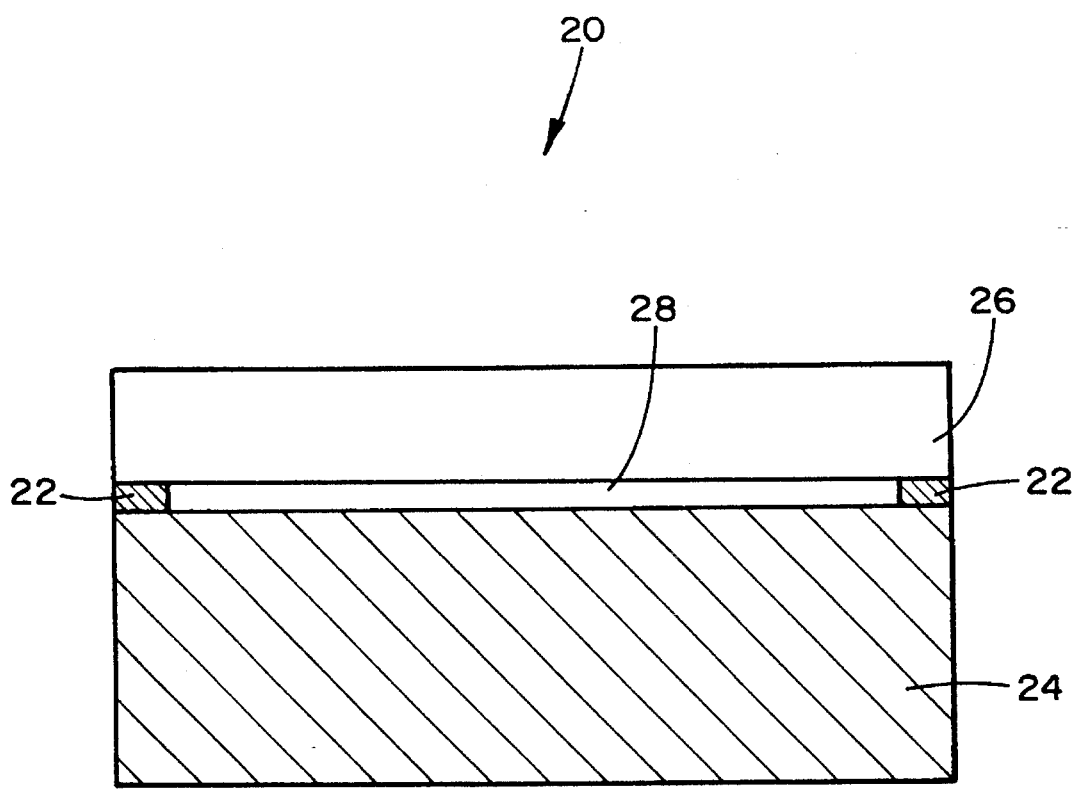
FIG. 2 is a cross-sectional view of another possible sealed composite assembly having shims welded to its perimeter prior to sealing that may be used in the present invention.

Reference is now made to FIGS. 1 and 2 which illustrate cross sectional views of possible composite assemblies prior to the sealing step which may be employed in the present invention. In FIG. 1, the composite assembly 10 contains a reactive metal or metal alloy backer plate 12 which has a cladding plate 14 positioned on top of backer plate 12. No shims are used in the composite assembly of FIG. 1; however, a evacuation nipple, not shown in the drawing, may optionally be present. A small gap 16 is located between backer plate 12 and cladding plate 14. If a evacuation nipple was present in the assembly shown in FIG. 1 it would be positioned at one end of the assembly so the one of its ends enters into the gap. The nipple is then welded to the assembly using conventional tack-welding processing conditions and used to evacuate air from the gap.

FIG. 2 shows a composite assembly 20 containing shims 22 which are positioned between backer plate 24 and cladding plate 26. A small gap 28 is located between backer plate 24 and cladding plate 26. The shims 22 are tack-welded along the perimeter of backer plate 24.

The shims employed in the present invention are typically composed of the same materials as found in the backer plate and they have a thickness of from about 30 to 75 mils and a width of about 0.5 to about 1 cm. Larger shims are also contemplated in the present invention. More preferably the shims have a thickness ranging from about 50 to 60 mils and a width of about 0.75 to about 0.9 cm.

When no shims are employed in the present invention, the composite assembly is sealed as indicated hereinbelow to provide a self-contained envelope and heated prior to hot roll bonding under conditions that are effective to diffuse oxygen and nitrogen away from the interface of the composite assembly so that a sufficiently strong bond between the backer plate and the cladding plate is obtained which is free from, or essentially free from, nitrides and/or oxides of the metals present. As stated above, an evacuation nipple may be provided when no shims are present to aid in the evacuation of air from the small gap. If a nipple is present, the assembly is subjected to evacuation prior to sealing.

Typically, in the present invention the self-contained envelope not containing any shims is heated prior to hot roll bonding at a temperature of from about 1600° F. to about 2000° F. for a time of about 1 to about 3 hours. More specifically, the self-contained envelope not containing any shims is heated at 1700° F. to about 1850° F. for a period of time of from about 1 to about 2 hours.

If shims are employed in the present invention as is shown in FIG. 2, the composite assembly is partially sealed leaving a small exhaust hole in the assembly perimeter which can be used to evacuate residual gases that may be trapped in the gap after partially welding the composite assembly. An evacuation nipple as described above, but not shown in FIG. 2, is welded into the hole and is used to evacuate the residual gases from the gap. After the gases have been evacuated the small nipple is sealed shut by welding.

Figure 3:
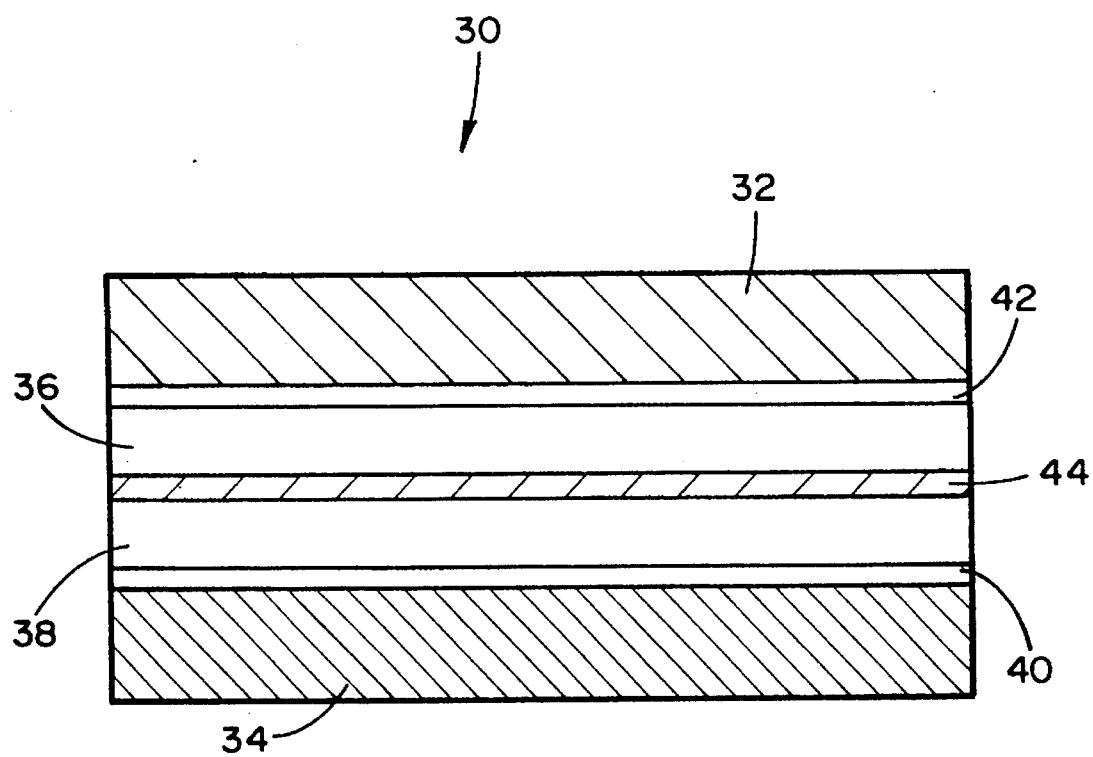
FIG. 3 is a cross-sectional view of a double pack composite assembly that may be used in the present invention.

It should be noted that when tantalum or niobium are employed as the cladding plate, a single pack assembly as described hereinabove, and as shown in FIGS. 1 and 2, may not be practical since those reactive metals are known to readily oxidize at high temperatures used in the hot roll bonding process. To avoid oxidation of those reactive metals, a double pack assembly as shown in FIG. 3 which excludes air should be used. In FIG. 3, the double pack composite assembly 30 comprises backer plates 32 and 34 and Ta or Nb cladding plates 36 and 38. Gaps 40 and 42 are provided between each of the backer plates and the cladding plates. A parting agent 44, such as $TiO_2$ slurry or lime slurry, is provided between the cladding plates 36 and 38. A cover strip of titanium sheets, not shown in FIG. 3, can be fillet welded to each of the backer plates along the perimeter thereof. An evacuation nipple may also be used in this pack assembly to permit pack evacuation.

In accordance with the present invention, the composite assemblies shown in FIGS. 1–3 are sealed using conventional welding techniques that are well known to those skilled in the art. In cases wherein an evacuation nipple is present, the composite assembly is partially welded leaving a small hole on one side of the assembly extending into the gap wherein the evacuation nipple may be placed. After evacuation, the nipple is sealed shut by welding.

Classic Gas-Tungsten Arc (GTA) Welding is the preferred welding method that may be employed in the present invention to seal the composite assembly into a self-contained envelope. Other methods of sealing the composite assembly that may be used in the instant invention include, but are not limited to, electron beam welding, fusion welding and diffusion bonding in a heated press. In any of these methods, sealing is conducted in the present of an inert gas such as helium or argon.

The self-contained envelope is then subjected to hot roll bonding using conventional procedures and standard milling equipment that are well known to those skilled in this art. The term hot roll bonding implies that the self-contained envelope is rolled to a desired gauge by means of dies or rolls while it is being heated at temperatures sufficient to prevent strain hardening of the reactive metals. Typically, in the present invention hot roll bonding is conducted at a temperature of from about 1500° F. to about 2000° F. More preferably, hot roll bonding is carried out at a temperature of from about 1700° F. to about 1800° F.

It has been observed in the present invention that during hot working at least a 5–10%, preferably 15–40%, reduction in the thickness of the composite plate must be obtained to ensure a sound metallurgically bond. If hot roll bonding does not provide at least a 5% reduction, a sufficiently strong bond between the backer plate and the cladding plate may not be obtained. Moreover, since the cladding plate and the backer plate are free of surface oxides, a strong bond at the backer plate/cladding interface will result.

The hot bonded clad reactive metal plate composite may be subjected to other post-treatment processes that are commonly employed in this art. For example, one or more post-treatment processes such as sandblasting, pickling, ultrasonic inspection, hot rolling to gauge and annealing may be employed in the present invention.

In a highly preferred embodiment of the present invention when shims are employed, the hot rolled composite product is sandblasted and pickled and thereafter subjected to ultrasonic inspection to ensure that a fully bonded product is produced. The composite plate is then rolled to a desired gauge by subjecting the hot rolled composite plate to alpha-beta rolling at a temperature of from about 1400° F. to about 1650° F. and then the alpha-beta rolled plate is annealed at a temperature of from about 1300° F. to about 1600° F. for a period of time of from about 15 minutes to about 120 minutes. The annealed composite plate may then be sandblasted and pickled.

More preferably, when this preferred post-treatment scheme is followed it is highly preferred that alpha-beta rolling be conducted at a temperature of about 1600° F. and that annealing be conducted at a temperature from about 1400° F. to about 1500° F. for period of time of about 30 minutes.

In accordance with another aspect of the present invention, a clad reactive metal plate composite that is highly resistant to corrosion and that contains a fully metallurgical bond between the backer plate and the clad layer is provided. In addition to the foregoing characteristics, the clad plate composites produced in the instant invention have excellent mechanical properties such as yield strength, tensile strength and % elongation which are comparable to standard solid metal plates. Such clad reactive metal plate composites produced in the present invention are suitable for a wide variety of applications. Some specific examples wherein the reactive metal clad plate composites of the instant invention may be employed is in the production of tanks, pressure vessels, ducting, tubsheets, piping, flanges, anodes and the like.

The following examples are given to illustrate the present invention. As will be apparent to those skilled in this art, numerous variations are possible and thus the scope of the present invention should not be limited thereto.

EXAMPLE 1

Preparation of Ti Grade 7/Ti Grade 2 Roll-Clad Plate

A titanium plate composite was prepared in accordance with the present invention as follows:

A flat 1.27" (3.23 cm)-thick Grade 2 Titanium (unalloyed) plate was ground and pickled using techniques that are well known to those skilled in the art to clean the surfaces of the titanium-containing backer plate. A cladding plate comprising a flat 0.070" (0.18 cm)-thick Grade 7 titanium (Ti-0.15Pd) sheet was first pickled and then positioned on top of the backer plate.

The composite assembly was then sealed shut around its perimeter by employing a GTAW fillet welding process. The self-contained envelope was then heated at 1700° F. for about 2 hours prior to subjecting the same to hot roll bonding. The heat treatment step serves to diffuse oxygen and nitrogen away from the interface prior to hot roll bonding the self-contained envelope. The pack size of the assembly was 1.34" (3.4 cm) thick×30.4" (77.2 cm) wide× 31" (78.7 cm) long.

Thereafter, the self-contained envelope was subjected to hot roll bonding which comprised three separate and independent hot rolling step. In the first hot rolling step, the self-contained envelope was heated at 1700° F. and rolled until at 35% reduction in the initial thickness was obtained. After the first rolling pass, a second pass was conducted at 1610° F. until a 29% reduction of the thickness of the composite plate was obtained. A third rolling pass at 1550° F. was then performed until a 10% reduction in thickness was obtained.

The final titanium plate composite produced in this example was 0.56" (1.42 cm) thick×31" (78.7 cm) wide×72" (182.88 cm) long. Moreover, based on microsection examination at 100–200× magnification the titanium plate composite was more than 90% bonded at the interface.

EXAMPLE 2

Preparation of Ti Grade 7/Ti Grade 2 Roll-Clad Plate

A Ti Grade 7/Ti Grade 2 roll clad plate was prepared as follows:

A Ti Grade 7 cladding plate whose dimensions are 0.375" (0.952 cm) thick×20.5" (52.07 cm) wide×28.75" (73.02 cm) long and a Ti Grade 2 backer plate whose dimensions are 4.25" (10.75 cm) thick×20.5" (52.07 cm) wide and 28.75" (73.02 cm) long were ground and pickled in accordance with the procedure described in Example 1.

Shims composed of Ti Grade 2 whose dimensions are 0.375" (0.952 cm) wide×0.063" (0.16 cm) thick were tack-welded onto the titanium-containing backer plate along the perimeter prior to sealing and the cladding plate was positioned on top of the shims such that a small gap between the cladding plate and the backer plate was present.

Next, the pack assembly was partially sealed using an electron beam welding apparatus. A small hole having a diameter of about 0.25" (0.63 cm) was left at one location in the pack assembly during the sealing process. A nipple composed of Ti Grade 2 was welded into the small hole and the pack assembly was then evacuated and back filled with air three times to remove any residual gases that may be trapped in the gap and thereafter completely sealed under vacuum. The sealed composite assembly thus produced had a size of about 4.75" (12.06 cm) thick×20.5" (52.1 cm) wide×28.8" (73.1 cm) long.

The sealed assembly was then hot rolled as follows: A first hot rolling pass at 1800° F. was conducted until a 16% reduction in the thickness of the sealed assembly was obtained. A second hot roll pass at the same temperature was performed until a 30% reduction in the thickness of the sealed assembly was obtained and a third pass at the same temperature was also performed which resulted in another 30% reduction of the thickness of the sealed assembly.

The hot rolled composite was then sand blasted, pickled and ultrasonic inspection using test procedure ASME SA-578 (S-7 criteria) was conducted to make sure that bonding between the cladding plate and the backer plate had occurred.

After conducting the inspection, the hot rolled composite was alpha-beta rolled at 1600° F. until the thickness of the composite was 0.440" (1.12 cm). The alpha-beta rolled product was thereafter annealed at 1450° F. for 30 minutes and then was sandblasted and pickled to provide a composite plate whose dimension are 0.429" (1.09 cm) thick×20.5" (52.1 cm) wide×308" (782 cm) long.

The mechanical properties of the composite plate thus produced were then determined and the results of the test were as follows (Note: Long. Dir. denotes longitudinal direction and Trans. Dir. denotes transverse direction):

| Properties | Long. Dir. | Trans. Dir |
|---|---|---|
| Yield Strength[1] (ksi) | 40 | 47 |
| Tensile Strength[1] (ksi) | 61 | 64 |
| % Elongation[1] | 34% | 34% |
| 1.5 and 2 T radius Bend | Passed | Passed |
| Bond Shear Strength[2] | 42 ksi | |

[1]Determined by standard test procedure ASTM E-8.
[2]Determined by standard test procedure ASME SA-265.

EXAMPLE 3

Preparation of Zr-702/Ti Grade 2 Roll Clad Plate

In this example a Zr-702/Ti Grade 2 roll clad plate was prepared in accordance with the present invention. Specifically, the roll clad plate was prepared by first subjecting a 0.26" (0.66 cm) thick×20.5" (52.1 cm) wide×28.75" (73.02 cm) long Zr-702 plate (Unalloyed Zr) to shot blasting and pickling. A Grade 2 backer plate whose dimensions are 2.32" (5.89 cm) thick×21" (53.3 cm) wide×27.75" (57.78 cm) long was also pre-treated prior to use by subjecting the same to grinding and pickling.

A composite assembly was then provided by tack-welding 0.375" (0.952 cm) wide×0.063" (0.16 cm) thick Ti Grade 2 shims onto the backer plate perimeter prior to laying-up the assembly. The cladding layer was then positioned on the shims providing a small gap between the backer plate and the cladding plate. The perimeter of the composite assembly was then partially sealed by GTA welding leaving a small hole having a diameter of about 0.25" (0.63 cm) in the assembly. A Ti Grade 2 nipple was then welded into the hole and the pack was evacuated and back filled with air three times and thereafter the nipple was sealed under vacuum. The pack size was 2.64" (6.12 cm) thick×21" (53.3 cm) wide ×27.8" (70.6 cm) long.

The sealed assembly was then subjected to hot roll bonding using a 3-pass hot rolling scheme. In the first pass, the sealed assembly was hot rolled at 1825° F. which resulted in a 15% reduction in the thickness of the assembly. A second pass at 1800° F. provided a 30% reduction and a third pass at 1800° F. also provided another 30% reduction in the thickness of the sealed assembly.

The hot rolled composite thus produced was then subjected to the same post-treatment processes as described in Example 2 except that the composite was alpha-beta rolled to a thickness of 0.360" (0.91 cm).

The final composite plate produced was 0.347" (0.88 cm) thick×24.75" (62.87 cm) wide by 153" (388.6 cm) long and it had a cladding layer whose thickness was 0.037" (0.094 cm). Moreover, the composite plate was >98% bonded at the interface.

The mechanical properties of this composite plate were determined using the same standard test procedures as described in Example 2 and are as follows:

| Properties | Long. Dir. | Trans. Dir. |
|---|---|---|
| Yield Strength (ksi) | 42 | 46 |
| Tensile Strength (ksi) | 63 | 65 |
| % Elongation | 36 | 33 |
| 1.5 and 2 T radius Bend | Passed | Passed |
| Bond Shear Strength | 30 ksi | |

EXAMPLE 4

Preparation of Ti Grade 7/Ti Grade 2 Roll-Clad Plate

In this example, a 0.22" (0.56 cm) thick by 60.6" (153.9 cm) wide by 60.6" (153.9 cm) long Ti Grade 7 cladding plate and a 0.92" (2.34 cm) thick by 58.8" (149.3 cm) wide by 61" (154.9 cm) long Ti Grade 2 backer plate were used. Both plates were in standard mill sandblasted and pickled surface conditions.

Ti Grade 2 shims each having a width of 0.375" (0.952 cm) and a thickness of 0.063" (0.16 cm) were tack welded onto the backer plate in accordance with the description provided in Example 3. After the shims were in place, the cladding layer was positioned on top of the backer plate leaving a small gap in between these materials. The composite assembly was partially sealed at the perimeter as indicated in Example 3 and a 0.25" (0.63 cm) diameter Ti Grade 2 nipple was sealed into the hole. The sealed assembly containing the nipple was evacuated and then back filled with air. This procedure was repeated three times and then the nipple was sealed off under vacuum. The sealed assembly in this example was 1.2" (3.0 cm) thick by 58.8" (149.3 cm) wide by 61" (154.9 cm) long.

The aforementioned sealed assembly was hot rolled using a 2-pass hot rolling scheme. In the first pass, the assembly was hot rolled at 1825° F. which resulted in a 16% reduction in the thickness of the sealed assembly. Thereafter, a second cross roll pass at 1800° F. was performed. The second pass resulted in a 21% reduction in the thickness of the composite plate.

The hot worked composite thus produced was then subjected to the same post-treatment processes as described in Example 2 except that the composite was alpha-beta rolled to a thickness of about 0.387" (0.98 cm).

The final composite plate produced was 0.375" (0.95 cm) thick by 59" (149.9 cm) wide by 115" (292.1 cm) long. Moreover, the composite plate was >98% bonded at the interface and it contained a 0.058" (0.147 cm) thick cladding layer.

The mechanical properties of this composite plate were determined using the same standard test procedure as described in Example 2 and are as follows:

| Properties | Long. Dir. | Trans. Dir. |
|---|---|---|
| Yield Strength (ksi) | 48 | 52 |
| Tensile Strength (ksi) | 68 | 70 |
| % Elongation | 30% | 29% |
| 2.0 T radius bend | — | Passed |

EXAMPLE 5

Preparation of Zr-702/Ti Grade 2 Roll-Clad Plate

In this example, a shot blasted and pickled Zr-702 cladding plate whose dimensions are 0.25" (0.63 cm) thick by 51.5" (130.8 cm) wide by 60.6" (153.9 cm) long, and a ground and pickled 0.92" (2.34 cm) thick by 52" (132.1 cm) wide by 61" long (154.9 cm) Ti Grade 2 plate were used.

Ti Grade 2 shims each having a width of about 0.375" (0.95 cm) and a thickness of about 0.063" (0.16 cm) were tack-welded onto the Ti Grade 2 backer plate perimeter and the Zr-702 cladding layer was positioned on top of the backer plate.

The assembly was then welded in accordance with Example 3 and evacuated in accordance with the procedure described in Example 4.

After sealing shut the assembly, hot rolling at 1825° F. was performed resulting in a 17% reduction in the thickness of the assembly.

The post-treatment process described in Example 2 was then performed on the hot worked composite except that the composite was alpha-beta rolled to a thickness of about 0.405" (1.03 cm).

The final composite plate contained a 0.076" (0.193 cm) thick cladding layer and was >98% bonded at the interface.

The mechanical properties of this composite are as follows:

| Properties | Long. Dir. | Trans. Dir. |
|---|---|---|
| Yield strength (ksi) | 42 | 44 |
| Tensile Strength (ksi) | 60 | 62 |
| % Elongation | 35 | 31 |
| 2.0 T radius bend | Passed | Passed |

The above preferred embodiments and examples are given to illustrate the scope and spirit of the present invention. These embodiments and examples will make apparent to those skilled in the art other embodiments and examples. These other embodiments and examples are also with the contemplation of the present invention. Therefore, the present invention should be limited only by the appended claims.

What is claimed is:

1. A process for the production of a clad reactive metal plate composite which contains a clad layer of a chemically resistant reactive metal or metal alloy fully metallurgically bonded to a reactive metal or metal alloy backer plate, wherein said process comprises (a) providing a composite assembly, wherein said composite assembly comprises at least one chemically resistant reactive metal or metal alloy backer plate, and at least one cladding plate composed of a chemically resistant reactive metal or metal alloy, wherein said cladding plate is positioned in proximity to said backer plate so that there is at least one relatively small gap located between said backer plate and the cladding plate;

(b) sealing the composite assembly of step (a) along its perimeter under conditions sufficient to provide a self-contained envelope; and (c) hot roll bonding the self-contained envelope of step (b) under conditions sufficient to form a metallurgical bond between the backer plate and the cladding plate.

2. The process of claim 1 wherein the backer plate is composed of titanium, zirconium, niobium, tantalum or an alloy thereof.

3. The process of claim 2 wherein the backer plate is composed of pure titanium or titanium that is alloyed with aluminum, vanadium, molybdenum, zirconium, nickel, palladium or mixtures thereof.

4. The process of claim 3 wherein the titanium-containing backer plate is composed of pure titanium, Ti-0.3Mo-0.8Ni or Ti-3Al-2.5 V.

5. The process of claim 1 further comprising welding an evacuation nipple composed of the reactive metal or metal alloy of the backer plate to said composite assembly such that said evacuation nipple enters said gap.

6. The process of claim 1 wherein the backer plate after hot roll bonding has a thickness up to 75 mm.

7. The process of claim 6 wherein the backer plate after hot roll bonding has a thickness of from about 1.5 to about 60 mm.

8. The process of claim 1 wherein the cladding plate is composed of titanium, zirconium, niobium, tantalum, or an alloy thereof.

9. The process of claim 8 wherein the cladding plate is composed of titanium that is alloyed with zirconium.

10. The process of claim 1 wherein the cladding plate after hot roll bonding has a thickness of from about 0.5 to about 10 mm.

11. The process of claim 10 wherein the thickness of said cladding plate after hot roll bonding is from about 1.0 to about 3.0 mm.

12. The process of claim 1 wherein the gap is provided by placing reactive metal or metal alloy shims between the backer plate and the cladding plate.

13. The process of claim 12 wherein the shims are composed of titanium, zirconium, niobium, tantalum or an alloy thereof.

14. The process of claim 12 wherein the shims have a thickness of from about 30 to about 75 mils and a width of about 0.5 to about 1 cm.

15. The process of claim 14 wherein the shims have a thickness of from about 50 to 60 mils and a width of about 0.75 to about 0.9 cm.

16. The process of claim 1 wherein said sealing step comprises gas-tungsten arc welding, electron beam welding, fusion welding or diffusion bonding.

17. The process of claim 12 further comprising welding an evacuation nipple composed of said reactive metal or metal alloy of said backer plate to said composite assembly wherein the inert gas atmosphere used in step (b) and the residual air left in the gap are evacuated prior to sealing the composite assembly.

18. The process of claim 1 wherein hot roll bonding is carried out at a temperature of from about 1500° F. to about 2000° F.

19. The process of claim 18 wherein hot roll bonding is carried out at a temperature of from about 1700° F. to about 1800° F.

20. The process of claim 1 wherein said hot roll bonding results in a reduction in the thickness of the composite that is greater than about 5–10%.

21. The process of claim 1 further comprising heat treating the self-contained envelope at a temperature of from about 1600° F. to about 2000° F. for a period of time from about 1 to about 3 hours prior to conducting step (c).

22. The process of claim 21 wherein said heating step is conducted at temperature of from about 1700° F. to about 1850° F. for a period of time from about 1 to about 2 hours.

23. The process of claim 1 further comprising pre-treating the backer plate and the cladding plate prior to providing the composite assembly.

24. The process of claim 23 wherein the pre-treatment comprises grinding, shotblasting or pickling.

25. The process of claim 1 further comprising post-treating the hot-rolled product of step (c).

26. The process of claim 25 wherein said post-treatment comprises the steps of (i) ultra-sonic inspection; (ii) alpha-beta rolling at temperatures of from about 1400° F. to 1650° F.; and (iii) annealing at a temperature of from about 1300° F. to about 1600° F. for a period of time for about 15 to about 120 minutes.

* * * * *